Oct. 15, 1968 B. STRONG 3,405,455
FLUID DRIVEN PROCESSING MACHINE
Filed July 27, 1966
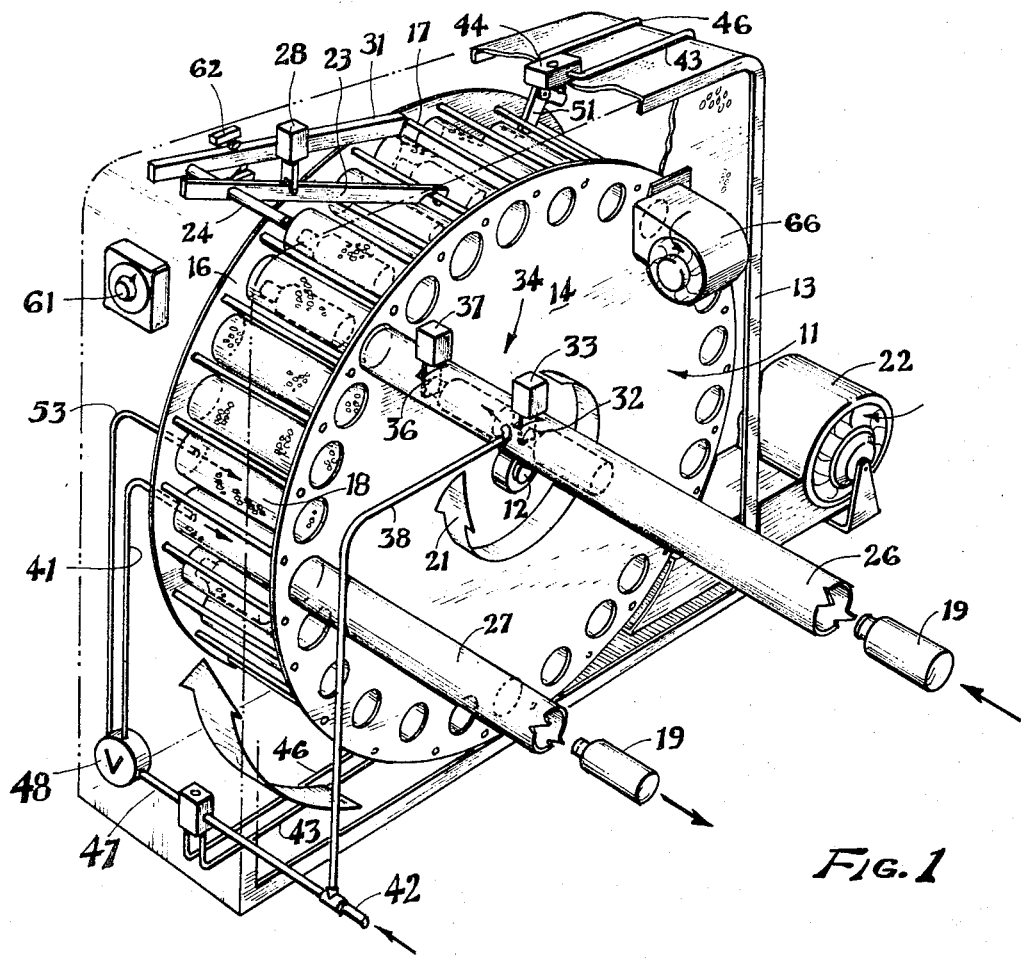
Fig. 1
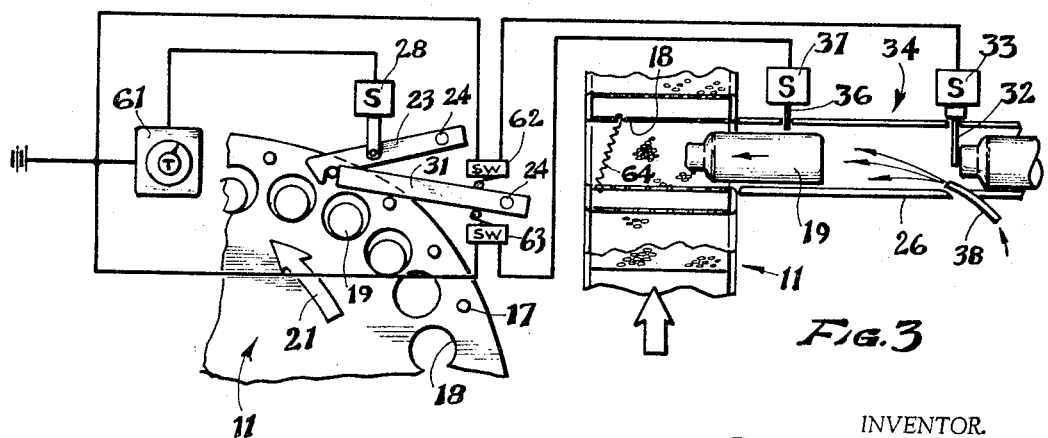
Fig. 2
Fig. 3
INVENTOR.
BERNARD STRONG
BY Warren T. Jessup
ATTORNEY United States Patent Office 3,405,455
Patented Oct. 15, 1968

3,405,455
FLUID DRIVEN PROCESSING MACHINE
Bernard Strong, Beverly Hills, Calif., assignor to Strong Plastics Inc., Inglewood, Calif., a corporation of California
Filed July 27, 1966, Ser. No. 568,309
14 Claims. (Cl. 34—20)

ABSTRACT OF THE DISCLOSURE

A carrier is freely rotatable on a shaft. Spaced around the circumference are sockets for receiving articles to be cooled, such as freshly molded plastic containers. A stream of cool air is directed tangentially against the articles held in the sockets, simultaneously causing the carrier to rotate, while cooling the hot articles. Means are provided for loading the containers into the sockets at one station and removing them at another station.

---

This invention relates to a machine and process for moving articles being processed from one position to another. More specifically, it relates to a simple machine and process for changing the temperature of articles being processed and at the same time moving the articles from one position to another.

The present invention is well adapted to the problem of cooling molded or extruded plastic articles. The specific embodiment of the invention will be described in that context.

In the fabrication of plastic articles, for example, plastic beverage bottles, the resinous or plastic material must be molded or otherwise shaped or formed while at a fairly high temperature. Once the formation operation is complete, further processing, such as cutting and/or reaming of the neck and mouth, is best done at a lower temperature, when the plastic is more easily handled and is somewhat more rigid. This requirement involves the cooling of the containers from the time they are discharged from the molding machine until they are operated upon by the subsequent machine, for example, a mouth reaming machine, in the case of a beverage container.

A common expedient to solve this problem in the past has been the conveying of the containers along conveyor belts or rollers while blowing air across the conveyor belt or the conveyor rollers in order to cool the containers in their transit. Even when the roller or conveyor belts have been tiered one above the other, there has been a requirement for considerable space in the factory just to accommodate this necessary cooling operation. The prior machines and processes have not only occupied an inordinate amount of space in the factory, but also have required, in addition to the cooling fans spaced along the belt, some form of often complex power means to keep the conveyor line moving in such a way as to dependably move the containers along the cooling line.

The present invention involves placing the articles to be cooled (or otherwise processed) into a receiving socket or other receiving means on a carrier, and then causing the receiving socket to move around to another position. This movement is effected by a fluid stream, such as a blower fan, which serves the double purpose of advancing the article along the cooling path and also providing the cooling air that cools the article.

The stream of air exerts a steady force on the containers and the carrier, which may be easily interrupted by simply arresting or latching the motion of the carrier or other receiving means in which the containers are temporarily mounted. In this way, there is no need to precisely control the driving means, because it is a constant stream of air. It is merely necessary to put an abutment, latch, or stop selectively against the carrier whenever it is desired to load and/or unload an article from the carrier. Thus, this means of driving the carrier in its cycle leads to a very simple construction, free of any requirement for complex synchronizing linkages.

Another important advantage of the present invention is that the stream of air serves the double function of advancing the containers or other articles around the cooling path, and also providing the cooling medium which operates upon the articles to cool them. The cooling path is a closed loop, preferably the circumference of a circle whose center is the axis or shaft around which the carrier rotates.

The present invention also includes simple means for pneumatically loading the articles into the movable carrier at the precise time when the carrier is brought to a stop by being arrested against the force of the blower. There is also provided pneumatic means operable during the same interval for ejecting a cooled container from the carrier. The present invention also incorporates dual discharge or ejection stations, either one of which may selectively be employed to eject cooled articles from the carrier. One ejection station is employed when the articles are to be sent to a guide means, such as a pneumatic tube, and thence on to a further processing machine, while another ejection station is used when the cooled articles are merely to be discharged from the carrier and gathered for further processing.

A preferred form of the present invention will now be described with reference to the accompanying drawing. There will be illustrated, as an example, a rotatably mounted carrier, especially designed and adapted to receive and cool plastic beverage containers, such as plastic milk bottles.

In the drawing,

FIGURE 1 is a perspective view of a machine constructed in accordance with the present invention.

FIGURE 2 is a fragmentary view, schematically illustrating particularly the arresting or latch mechanism which is incorporated in the machine, and FIGURE 3 is a fragmentary section view, schematically illustrating the loading mechanism by which containers are loaded into the carrier.

A schematic wiring diagram relates both FIGURES 2 and 3 to show how the structural elements shown in these respective figures are interrelated electrically.

Referring to the drawing, 11 designates a wheel mounted to rotate freely about an axis represented by the mounting shaft 12. The shaft 12 is suspended and mounted in an external frame 13. The frame 13 has centrally extending posts (not shown) at each side in which the ends of the shaft 12 are journaled. The wheel 11 is mounted on low-friction bearings so that it may turn very freely in either direction.

The wheel 11 consists of a pair of side plates 14 and 16, secured together around the periphery by a plurality of cross bars 17 to form of the wheel 11 a sort of squirrel cage structure. Spaced circumferentially around the wheel 11 and extending in an axial direction between the plates 14 and 16 are a plurality of sleeves 18, forming socket-like receiving means for articles 19 to be conveyed and cooled.

A substantially constant torque is applied to rotate the wheel 11 in the direction shown by the arrow 21, by means of a blower 22 directed against the sockets 18, substantially tangentially with respect to the shaft axis 12. The blower 22 thus applies a steady moving force or rotating torque against the carrier 11, which, if uninterrupted, causes the wheel 11 to constantly rotate in the direction of the arrow 21.

Since it is necessary to load and unload containers 19 into the wheel 11, means are provided for intermittently arresting and then releasing the wheel against the torque of the blower 22. This means comprises a latch 23 which hooks successively over each cross bar 17 and which is pivotally and oscillatably mounted about a shaft 24. For clarity of understanding, the mounting of the shaft 24 has not been shown; it will be understood that it is mounted fixedly in the frame 13.

The weight of the latch 23 normally keeps it against a bar 17, in position to hook the bar and thus arrest the wheel 11. In the position shown in FIGURE 1, the wheel is thus latched and arrested against rotation by the force of the air from the blower 22.

In this position, one of the sockets 18 is in registry with a pneumatic loading tube 26, serving as a loading station moving articles 19 into the sockets 18. By means of tube 26, articles 19 may be successively loaded into the wheel 11 whenever it is stopped with one of the sockets opposite the tube.

In this position of the wheel 11, another of the sockets 18 is in registry with an ejection station consisting of an ejection pneumatic tube 27 which receives containers 19 and guides or transmits them to another machine (not shown), where further processing on the articles may take place.

The wheel 11 is arrested by the latch 23 just long enough to permit the loading of an article 19, such as a hot, newly-processed beverage container, from the loading station 26 into a socket 18, and simultaneously to permit the ejection of a cooled article 19 into the ejection tube or station 27. The loading and ejection is done pneumatically as will be explained hereinafter.

After sufficient time has elapsed to complete this operation, the latch 23 is raised and wheel 11 is allowed to be moved under the force of the air blast from 22. This is done by a solenoid 28 coupled to the latch 23 which raises it whenever the solenoid is energized. Energization of the solenoid 28 is required only long enough to allow the latching cross bar 17 to clear the hook 23. Thereupon, the solenoid 28 is automatically de-energized, dropping the latch 23 down into position to hook the next bar 17, the impetus for the movement from station to station being provided by the blower 22, as explained hereinbefore. Erratic back movement of the wheel 11, which would be objectionable in the arrested position, is prevented by a ratchet bar 31, pivoted also on the shaft 24, the end of which drops down behind each bar 17 to prevent reverse rotation of the wheel 11. The ratchet bar 31 is also used as a sensing indicator by means of which the position of the wheel may be sensed and employed to actuate the pneumatic loading and unloading means, as will be explained later.

The loading from the tube 26 is accomplished by a constant stream of air which tends to move an article 19 to the left in FIGURE 1. Inward or loading movement of the article 19 is initially stopped by a solenoid-operated stop finger 32 normally biased downward into the path of the container 19 and raised out of the way by energization of a solenoid 33. The stop 32 constitutes the entrance gate to a waiting station 34, the exit gate of which is provided by another stop finger 36, also actuated by a solenoid 37. The solenoids 33 and 37 are reciprocally energized. The finger 36 is first elevated to permit pneumatic loading of a container 19 into a socket 18, following which the finger 36 is lowered and the finger 32 is raised to permit the entrance of another container 19 into the waiting station 34. An extra blast of air is provided by means of a constantly-operating pneumatic line 38, directed to blow a container 19 from the station 34 into the carrier 11.

After being loaded into the carrier 11 at the loading station 26, each container 19 moves intermittently around as the carrier 11 is rotated under the force of the blower 22. When a container comes opposite the ejection station 27, a blast or puff of air from an air line 41 blows the container out of the socket 18 and into the ejection tube 27. From this tube it is impelled by additional pneumatic means, not shown, to a machine for further processing. Air for this purpose is provided constantly to the inlet of tube 42. The air from the tube 42 does not go directly to the tube 41, but instead is routed by means of an air line 43 through a valve 44, thence back through lines 46 and 47 to a two-way distribution valve 48, which diverts it to the line 41. The valve 44 is normally closed and is opened only when a sensing operator 51 for the valve 44, mounted on the frame 13, senses that the wheel 11 is in arrested position, with sockets 18 in registry with the ejection station 27 and loading station 26. The sensing finger 51 is operated back and forth by bars 17 which also serve as the arresting abutments for the hook 23.

A second ejection station, represented merely by the next position above the pneumatic tube 27, is provided by means of which a cooled container 19 may be ejected directly from the wheel 11 into a catch box or basket, in case it is not desired to transmit the ejected containers through the tube 27. To use this station, another air ejection line 53 is provided which ejects a puff of air into the socket at the station immediately above the station 27.

Puffs of air passed by the valve 44 are directed selectively by the valve 48 to the line 41 or 53. The valve 48 is operated in dependence upon the availability of the further processing machine to which the tube 27 feeds. If this machine is shut down, the valve 48 automatically diverts the air to the line 53, so that containers are ejected, not into the tube 27, but freely from the wheel 11 into the room, so that they may drop into a collection basket or box.

The rate at which the wheel 11 is released and re-latched by the hook 23 is determined by an adjustable, free-running timer 61. The output from timer 61 feeds a pulse to operate the solenoid 28. The other operations of the machine are all in turn dependent upon the position of the wheel 11, as sensed through the positioning of the several cross bars 17. The solenoids 33 and 37 are energized, as shown in FIGURES 2 and 3, through a pair of microswitches 62 and 63 operated by the ratchet bar or arm 31. As noted, the puffs of ejection air are operated in dependence upon the valve 44 actuated by the arm or feeler 51.

It is preferred to make the sockets 18 open at both ends for maximum cooling effect. This, of course, necessitates some means for preventing the articles 19 from being blown into and out of the socket at the loading station. This is provided by a transverse flexible member such as the spring 64 at the end of the socket opposite to the entrance which registers with the tubes 26 and 27.

A cycle of operation will now be described. The cycle will be picked up with the finger 32 lowered to block articles 19; the finger 36 raised, having just admitted an article 19 into a socket 18; and the latch 23 engaged over a bar 17. The finger 36 is in raised position because the solenoid 37 is energized through the sensor switch 63 which has sensed that the ratchet bar 31 has dropped down and its end is in engagement with a cross bar 17.

The timer 61 now puts out a pulse of current, momentarily energizing the solenoid 28 and raising the hook 23. The pulse from the timer 61 raises the hook 23 long enough for the latched bar to clear the hook under the driving torque of the blower 22. As the wheel 11 rotates in the direction of the arrow 21 (FIGURE 2), the ratchet bar 31 is raised, opening the switch 63 and de-energizing the solenoid 37. This drops the finger 36 down across the loading tube 26. Continued raising of the bar 31 causes closing of the switch 62 energized in the solenoid 33 and raising the finger 32. This allows the pneumatic drive to force another container or article 19 into the waiting station 34, where it encounters the now-lowered finger 36. The wheel 11 continues to rotate until the next cross bar 17 engages the hook 23, now in lowered position by virtue of the de-energization of the solenoid 28.

As the next bar 17 comes into engagement with the hook 23, the ratchet bar 31 drops in behind a bar 17. Dropping of the bar 31 then energizes solenoid 33, dropping finger 32 into position across the tube 26. It also energizes solenoid 37, raising the finger 37 and allowing the article 19, which was in the waiting station 34, to be blown by the air 38 into the registering socket 18 of the now arrested wheel 11.

While the fingers 32 and 36 have been shown in the drawing as being interposed across the leading face of the containers 19, it has been found in practice that it is not necessary to so precisely time the interposition of these fingers as to cause them to drop exactly in front of the containers. Satisfactory operation is provided, even though the front edge of the container may have passed the finger 32, for example. The containers 19, being made of plastic, are so light that merely the pressure of the finger 32 on the side thereof will frictionally arrest the container and cause it to stop in the desired position.

With each loading operation there is, of course, an associated unloading operation at either the station 27, or the station immediately above. This is effected by the opening of the valve 44 through the operating finger 51, which places a puff of air on the air line 41, ejecting the container 19 into the ejection tube 27.

As noted hereinbefore, if it is not desired to use the ejection station 27, the position immediately thereabove may be employed by diverting the air to the air line 53.

While it would be quite feasible to use a continued blast of air at the ejection stations, it is preferred to use puffs of air, not only to conserve the air supply, but also because it has been found that puffs of air for a given air pressure provide a somewhat better impelling force to move the containers 19 from their static position in the sockets 18.

It will be readily appreciated, of course, that as each container moves from the loading station 26 around almost 360° to one of the ejection stations, it is constantly being cooled by the air from the driving fan 22, which is directed constantly around the periphery of the wheel 11 to provide cooling for the container. If the cooling provided by the blower 22 is not sufficient, auxiliary blowers, exemplified at 66, may be spaced around the periphery to give added flow of cooling air against the containers.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. Machine for conveying articles comprising:
    carrier means having at least one article receiving means,
    means for movably mounting said carrier means, and
    fluid stream means for directing a stream of fluid to move said carrier means, and thereby to move said receiving means from one position to another.

2. Machine in accordance with claim 1, wherein:
    said carrier means is mounted for rotation about an axis, and
    said receiving means is spaced from said axis.

3. Machine in accordance with claim 2, wherein:
    said stream means is directed against said receiving means generally tangentially of said axis, thereby to impart torque to said carrier means.

4. Machine in accordance with claim 3, wherein said stream is of substantially different temperature than articles received in said receiving means, whereby the temperature of said articles is substantially changed as said carrier means rotates.

5. Machine in accordance with claim 3, including:
    a plurality of said receiving means disposed circumferentially about said axis, and
    stop means for selectively arresting and releasing said carrier means, said arresting being in opposition to the torque applied by said stream means,
    thereby to selectively stop said carrier means for loading or unloading of articles.

6. Machine in accordance with claim 5, wherein:
    said receiving means comprise sockets having their openings directed substantially parallel to said axis,
    said axis being substantially horizontal.

7. Machine in accordance with claim 6, wherein said stream means is pneumatic,
    said machine also including,
    a loading station for loading an article into a socket stopped thereat,
    an ejection station for ejecting an article from a socket stopped thereat,
    pneumatic moving means for moving an article into a socket at said loading station and for ejecting an article from a socket at said ejection station.

8. Machine in accordance with claim 7, including:
    timing means for synchronously actuating said stop means and said pneumatic moving means,
    whereby articles are loaded and ejected when said carrier means is arrested.

9. Machine in accordance with claim 8, wherein:
    said timing means includes means for stopping said carrier means when sockets are opposite said stations,
    means for sensing the positioning of said carrier means with sockets opposite said stations,
    means responsive to said sensing means for actuating said pneumatic moving means, to load and eject articles.

10. Machine in accordance with claim 12, comprising:
    transport guide means for transporting articles to said carrier means,
    second force means for applying a substantially constant force to move said articles into said receiving means from said guide means,
    second stop means for selectively arresting and releasing articles in opposition to said second force means,
    timing means for said stop means for synchronously effecting release of an article into a receiving means by said second stop means when said carrier means is arrested by said first stop means.

11. Process for changing temperature of articles comprising:
    positioning, in a closed path, articles to be changed in temperature, and
    advancing said articles around said path by directing thereagainst a stream of fluid of temperature substantially difference from that of said articles.

12. Machine for conveying articles comprising:
    carrier means having at least one article-receiving means, means for movably mounting said carrier means,
force means for applying a substantially constant force to said carrier means to move said receiving means from one position to another, and
stop means for selectively arresting and releasing said carrier means, said arresting being in opposition to the moving force of said force means.

13. Machine in accordance with claim 1, comprising additionally:
means for loading an article into said receiving means along a path transverse to the direction of said stream.

14. Machine in accordance with claim 3, comprising additionally:
means for loading an article into said receiving means along a path generally paralleling said axis.

References Cited

UNITED STATES PATENTS

| | | | |
|---|---|---|---|
| 1,646,577 | 10/1927 | Chapman | 198—211 X |
| 1,651,912 | 12/1927 | Thompson | 198—209 |
| 1,836,641 | 12/1931 | Brett | 198—211 X |
| 2,066,283 | 12/1936 | Wadman | 65—348 |
| 2,077,608 | 4/1937 | Wood | 62—63 |
| 2,223,972 | 12/1940 | Sterling | 62—63 |
| 2,557,439 | 6/1951 | Kmentt | 18—6 |
| 2,599,721 | 6/1952 | Remington | 34—105 |
| 2,951,353 | 9/1960 | Morrison | 62—63 |
| 2,979,765 | 4/1961 | Stephens | 18—6 |
| 3,215,249 | 11/1965 | Hastings | 65—279 |
| 3,286,477 | 11/1966 | Adams | 62—63 |

WILLIAM J. WYE, *Primary Examiner.*